United States Patent
Gehlbach et al.

(10) Patent No.: US 11,139,641 B1
(45) Date of Patent: Oct. 5, 2021

(54) GROUP METER STACK WITH DISCONNECT SWITCH

(71) Applicant: Eaton Intelligent Power Limited, Dublin (IE)

(72) Inventors: James Lee Gehlbach, Lincoln, IL (US); Abhijeet Nitin Rathi, Pune (IN); Michael J. Ranta, Morton, IL (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/035,878

(22) Filed: Sep. 29, 2020

(51) Int. Cl.
*H02B 1/03* (2006.01)
*H02B 1/21* (2006.01)
*H02B 1/056* (2006.01)
*H02B 1/04* (2006.01)

(52) U.S. Cl.
CPC .............. *H02B 1/21* (2013.01); *H02B 1/03* (2013.01); *H02B 1/041* (2013.01); *H02B 1/056* (2013.01)

(58) Field of Classification Search
CPC ........................................................ H02B 1/03
See application file for complete search history.

(56) References Cited

U.S. PATENT DOCUMENTS

| | | | |
|---|---|---|---|
| 2,403,132 A * | 7/1946 | Sparkes | G01R 11/04 361/660 |
| 3,104,276 A | 9/1963 | Cataldo | |
| 3,183,298 A | 5/1965 | Weimer | |
| 4,118,754 A | 10/1978 | Duggan | |
| 5,466,889 A | 11/1995 | Faulkner et al. | |
| 5,936,934 A | 8/1999 | Kuribayashi et al. | |
| 7,239,502 B1 * | 7/2007 | Seff | G01R 11/04 361/624 |
| 7,400,495 B1 | 7/2008 | Ranta et al. | |
| 7,796,375 B2 | 9/2010 | Zhang | |
| 7,837,498 B2 * | 11/2010 | Zhang | H02B 1/03 439/517 |
| 8,243,423 B2 | 8/2012 | Ranta et al. | |
| 8,913,354 B2 | 12/2014 | Van Fossen et al. | |
| 9,478,949 B2 | 10/2016 | Zhang et al. | |
| 10,177,515 B2 * | 1/2019 | Whipple | H01R 27/02 |
| 10,637,215 B2 | 4/2020 | Walsh et al. | |
| 10,770,851 B2 * | 9/2020 | Whipple | H01R 27/02 |
| 2013/0258558 A1 | 10/2013 | Rusch et al. | |
| 2014/0098470 A1 | 4/2014 | Robinson et al. | |
| 2014/0099820 A1 | 4/2014 | Robinson et al. | |
| 2017/0054276 A1 | 2/2017 | Zhang et al. | |

* cited by examiner

*Primary Examiner* — Robert J Hoffberg
(74) *Attorney, Agent, or Firm* — Fox Rothschild LLP

(57) ABSTRACT

A power meter socket assembly includes a primary meter stack section with a first bus section including conductors oriented in a first plane and an extension meter stack section including a second bus section including conductors oriented in the first plane. The assembly includes a first connection section including flexible conductors. Each flexible conductor includes a first end electrically connected to a conductor of the first bus section and a second end electrically connected to a conductor of the second bus section. The assembly includes a power bus connection section and a disconnect switch. The switch includes line terminals electrically connected to the bus connection section and load terminals connected to the first bus section. The assembly includes a second connection section including flexible conductors oriented parallel to and below the first bus section to connect the line terminals of the switch to the bus connection section.

20 Claims, 7 Drawing Sheets

GROUP METER STACK WITH DISCONNECT SWITCH

BACKGROUND

The document describes methods and systems that are directed to a group meter stack with a disconnect switch.

Electric utility companies may require industrial facilities and other buildings and installations that have multiple power meters to have protection on the line side of each power meter. In a group meter stack, several meter sockets are arranged in series and are connected to three or four power phases using conductors. A disconnect switch such as a pullout safety device is a known device that can provide such protection. The group meter stack may include both primary and extension meter sockets which require electrical connection to three or four power phases using the conductors and connection to the disconnect switch.

Current systems that include disconnect switches can be complex to build and difficult to modify. This document describes a group meter stack arrangement that helps address these issues.

SUMMARY

Some embodiments of a power meter socket assembly include a primary meter stack section including a first bus section including a plurality of conductors that are oriented in a first plane. The power meter socket assembly includes an extension meter stack section including a second bus section including a plurality of conductors that are oriented in the first plane. The power meter socket assembly may include a first connection section including a plurality of flexible conductors. Each flexible conductor includes a first end that is electrically connected to a corresponding conductor of the first bus section and a second end that is electrically connected to a corresponding conductor of the second bus section. The power meter socket assembly may include a power bus connection section and a disconnect switch. The disconnect switch includes a plurality of line terminals electrically connected to the power bus connection section and a plurality of load terminals connected to the first bus section. The power meter socket assembly may include a second connection section including a plurality of flexible conductors that are oriented parallel to and below the first bus section to connect the plurality of line terminals of the disconnect switch to the power bus connection section.

In various embodiments, the conductors of the first bus section and the second bus section may include bus bars. The primary meter stack section may further include a first set of electric power meter sockets, each of which includes female socket members to receive and electrically connect an electric power meter to the first bus section. The extension meter stack section may further include a second set of electric power meter sockets, each of which includes female socket members to receive and electrically connect an electric power meter to the second bus section.

In various embodiments, each flexible conductor of the first and second connection sections may include a wire that extends within an insulating sleeve. The power meter socket assembly may further include a first set of lug connection assemblies that removably connects the first ends of the flexible conductors of the first connection section electrically to the first bus section. The power meter socket assembly may further include a second set of lug connection assemblies that removably connects the second ends of the flexible conductors of the first connection section electrically to the second bus section. The power meter socket assembly may further include a third set of lug connection assemblies that removably connects to first ends of the flexible conductors of the second connection section electrically to the power bus connection section. The second ends of the flexible conductors of the second connection section are removably connected electrically to the line terminals of the disconnect switch.

In various embodiments, the flexible conductors of the first connection section comprise pairs of flexible conductors, and each lug connection assembly of the first set of lug connection assemblies comprises a two-way connection lug configured to electrically join a pair of flexible conductors together in an L-shaped configuration. A first flexible conductor of the pair of flexible conductors removably connects the two-way connection lug of the first set of lug connection assemblies electrically to a corresponding lug connection assembly of the second set of lug connection assemblies. A second flexible conductor of the pair of flexible conductors comprises a first end that removably connects electrically to the two-way connection lug and a second end that removably connects electrically to a corresponding load terminal of the plurality of load terminals.

In various embodiments, the power meter socket assembly may further include jumper assemblies. Each of the load terminals is coupled to the first bus section via the jumper assemblies.

In various embodiments, each jumper assembly includes a z-shaped connection bar that is electrically connected to a corresponding bus bar of the first bus section or the second bus section via a lug connection assembly.

In various embodiments, the power meter socket assembly may further include a plurality of lug connection assemblies. Each of the flexible conductors of the first connection section is electrically connected to a corresponding conductor of the first bus section via one of the lug connection assemblies. Each of the load terminals of the disconnect switch is also electrically connected to a corresponding conductor of the first bus section via one of the lug connection assemblies that electrically connects the first connection section to the first bus section.

In various embodiments, each of the line terminals of the disconnect switch is electrically connected to a corresponding bus bar of the power bus connection section via a corresponding flexible conductor that includes a wire that extends within an insulating sleeve.

In various embodiments, the power meter socket assembly may further include a plurality of two-way connection lugs, each two-way connection lug is configured electrically join a pair of flexible conductors together in an L-shaped configuration. Each of the flexible conductors of the pair of flexible conductors of the first connection section is electrically connected to a corresponding conductor of the first bus section via one of the two-way connection lugs. Each of the load terminals of the disconnect switch is also electrically connected to a corresponding of two-way lug via one of the flexible conductors of the pair of flexible conductors. Each of the two-way connection lugs electrically connects the first connection section to the first bus section.

In various embodiments, each two-way connection lug includes a first orifice having a first center axis, a second orifice having a second center axis adjacent to the first orifice such that the first center axis and the second center axis are parallel, a third orifice having a third center axis perpendicular to the first orifice, and a fourth orifice having a fourth center axis perpendicular to the second orifice and offset from the third center axis such that the fourth center axis is in a direction which is perpendicular to the third center axis.

Some embodiments of a power meter socket assembly include a primary meter stack section including a first bus section including a plurality of conductors that are oriented in a first direction. The power meter socket assembly may include an extension meter stack section including a second bus section including a plurality of conductors that are oriented in the first direction. The first and second bus sections are on a single plane. The power meter socket assembly may include a flexible connection section including a plurality of flexible conductors that are oriented in a second direction. Each flexible conductor is electrically connected to a corresponding conductor of the first bus section and a corresponding conductor of the second bus section. The power meter socket assembly may include a power bus connection section and a disconnect switch. The disconnect switch includes a plurality of line terminals, each of which is electrically connected to the power bus connection section, and a plurality of load terminals, each of which is electrically connected to a corresponding conductor of the first bus section.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

In this document, the term "connected", when referring to two physical structures, means that the two physical structures touch each other. Devices that are connected may be secured to each other, or they may simply touch each other and not be secured.

In this document, the term "electrically connected", when referring to two electrical components, means that a conductive path exists between the two components. The path may be a direct path, or an indirect path through one or more intermediary components.

When used in this document, terms such as "top" and "bottom," "upper" and "lower", or "front" and "rear," are not intended to have absolute orientations but are instead intended to describe relative positions of various components with respect to each other. For example, a first component may be an "upper" component and a second component may be a "lower" component when a device of which the components are a part is oriented in a first direction. The relative orientations of the components may be reversed, or the components may be on the same plane, if the orientation of the structure that contains the components is changed. The claims are intended to include all orientations of a device containing such components.

Figure 1:
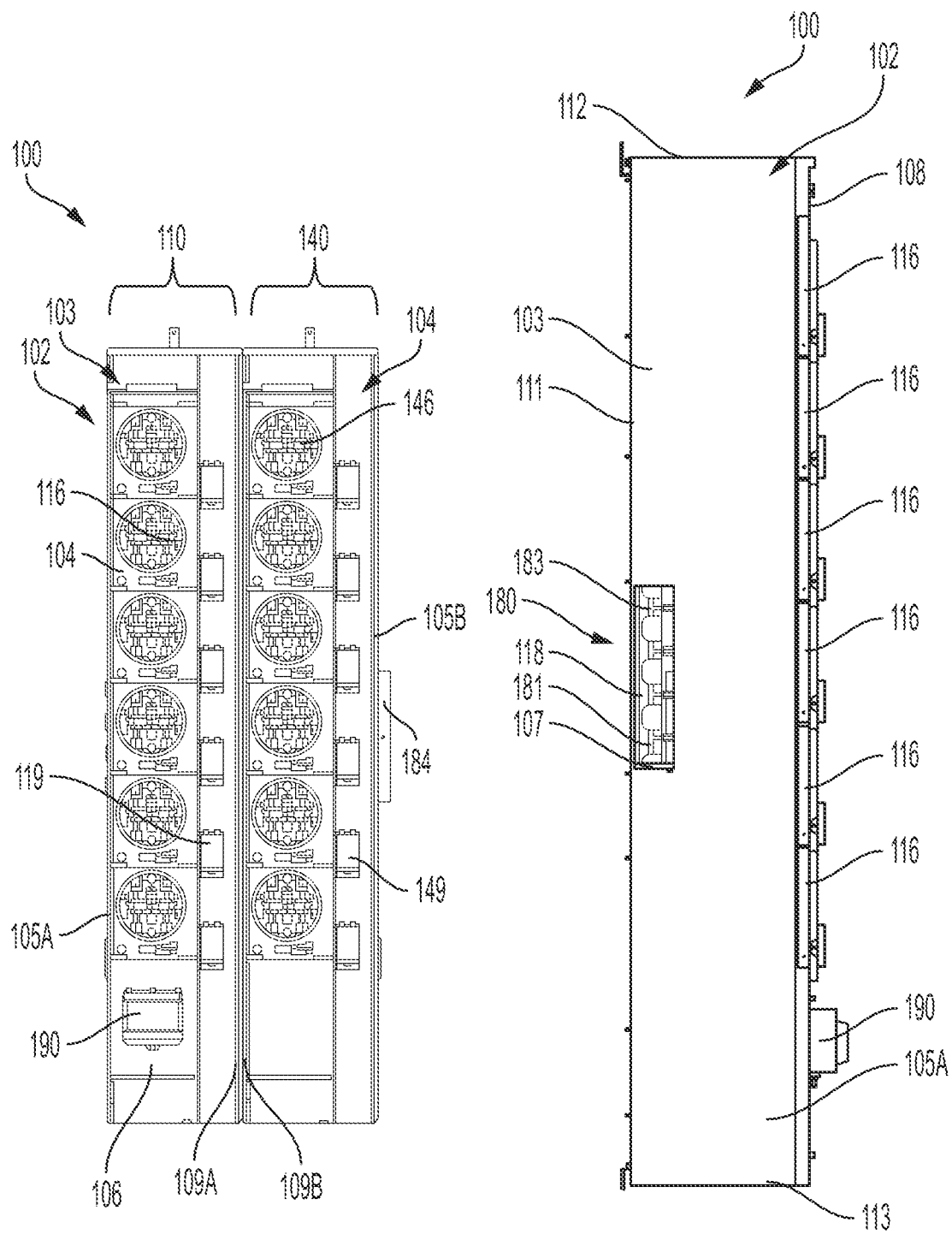
FIG. 1A illustrates a front view of a power meter socket assembly in accordance with various embodiments of the present disclosure.
FIG. 1B illustrates a second side view of the power meter socket assembly of FIG. 1A.
Figure 2:
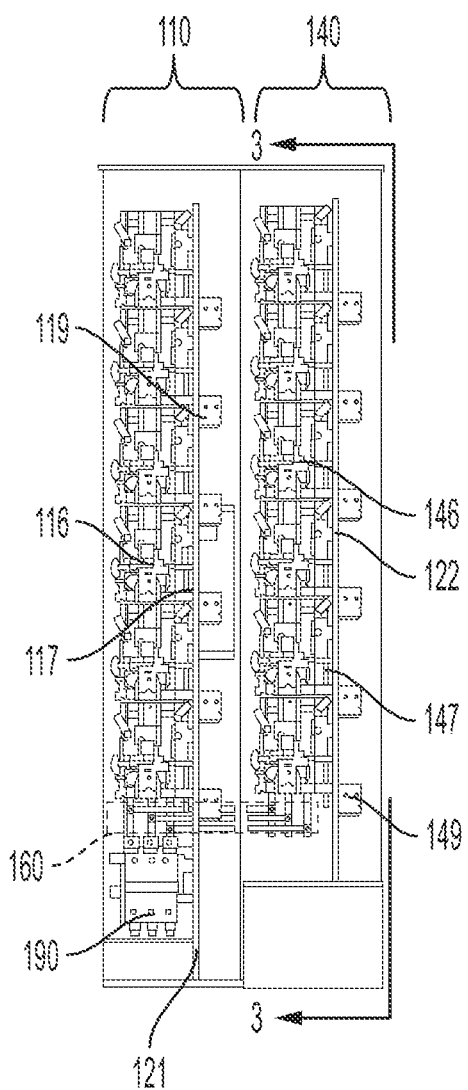
FIG. 2 illustrates an interior view of the power meter socket assembly.

The details of the power meter socket assembly 100 will be described in relation to FIGS. 1A-1B and FIG. 2. FIG. 1A illustrates a front view of a power meter socket assembly 100 in accordance with various embodiments of the present disclosure. FIG. 1B illustrates a second side view of the power meter socket assembly 100 of FIG. 1A. FIG. 2 illustrates an interior view of the power meter socket assembly 100. Additional features of the power meter socket assembly 100 will be described in relation to FIGS. 3-7.

Referring now to FIGS. 1A-1B and 2, the power meter socket assembly 100 includes a primary meter stack section 110 and an extension meter stack section 140. The assembly 100 includes a first enclosure section 103 for housing and enclosing the primary meter stack section 110. The assembly 100 includes a second enclosure section 104 for housing and enclosing the extension meter stack section 140.

The power meter socket assembly 100 includes a first connection section 160, including several components and generally defined by a bounding box as seen in FIG. 2. The power meter socket assembly 100 includes a first power bus connection section 180 associated with the primary meter stack section 110. A side wall 105A of the first enclosure section 103 includes at least one opening 107 to provide access to end connectors 183 of the bus bars 181 of the first power bus connection section 180. The bus bars 181 (FIG. 4) are arranged in a single plane. The bus bars 181 may be on a base 118 to receive utility supply form a main device (not shown). The base 118 may be made of plastic or other non-conductive material.

Each enclosure section 103, 104 and 106 includes a plurality of wall configured to enclose electrical components and bus bars as described herein. Thus, with respect to FIG. 1B, the first enclosure section 103 will be described. The first enclosure section 103 may include one or more of a first side wall 105A, a second side wall 109A (FIG. 1A), a back wall 111, a top wall 112, bottom wall 113 and a front wall 108.

The power meter socket assembly 100 may include a disconnect switch 190. The assembly 100 may include a third enclosure section 106 for housing the disconnect switch 190. In various embodiments, a third enclosure section 106 housing the disconnect switch 190 is one of above or below the first enclosure section 103, wherein connectors of the first connection section 160 extend between the first enclosure section 103 and the second enclosure section 104. In some variations, the connectors of the first connection section 160 may also extend into the third enclosure section 106 for connection to the disconnect switch 190. The disconnect switch 190 is connected on the line side of the meter sockets to provide protection for electric power meters plugged into the sockets.

In various embodiments, the first enclosure section 103 and the third enclosure section 106 may share the first side wall 105A, the second side wall 109A (FIG. 1A), the back wall 111, and the front wall 108. In various embodiments, the first side wall 105A may include sections, such as a first side wall section for the first enclosure section 103 and a second side wall section for the third enclosure section 106. In various embodiments, the front wall 108 may include different wall sections, such as a first front wall section for the first enclosure section 103 and a second front wall section for the third enclosure section 106. In various embodiments, the second side wall 109A may include sections, such as a first side wall section for the first enclosure section 103 and a second side wall section for the third enclosure section 106. In various embodiments, the back wall 111 may include sections, such as a first back wall section for the first enclosure section 103 and a second back wall section for the third enclosure section 106.

Referring still to FIGS. 1A-1B and 2, the primary meter section 110 may further include a first set of electric power meter sockets 116. Each meter socket 116 is configured to receive a utility meter (not shown). Each meter socket 116 may include female socket members (FIG. 10) to receive and electrically connect an electric power meter (not shown) to the first bus section 312 (FIG. 3) when the electric power meter (not shown) is placed in a corresponding one of the sockets 116. In some embodiments, each meter socket 116 may be a lever bypass type meter socket, as will be described in relation to FIG. 10, and may include a lever handle 117. In other variations, the meter socket 116 may be a plug-in type socket or other type of meter socket.

The extension meter stack section 140 may further include a second set of electric power meter sockets 146. Each meter socket 146 is configured to receive a utility meter (not shown). Each meter socket 146 may include female socket members (FIG. 10) to receive and electrically connect an electric power meter (not shown) to the second bus section 542 (FIG. 5) when the electric power meter (not shown) is placed in a corresponding one of the meter sockets 146. Each meter socket 146 may be a lever bypass type meter socket, as will be described in relation to FIG. 10, and may include a lever handle 147. In other variations, the meter socket 146 may be a plug-in type socket or other type of meter socket.

In the illustrations, there are six meter sockets 116 in the primary meter stack section 110 and six meter sockets 146 in the extension meter stack section 140. However, the assembly 100 may be expanded to accommodate additional meter sockets 116 and 146. In some variations, the assembly 100 may be reduced in size if the number of meter sockets 116 and 146 is reduced.

The power meter socket assembly 100 may include a plurality of primary tenant circuit breakers 119 associated with each meter socket 116 of the primary meter section 110. The power meter socket assembly 100 may include a plurality of extension tenant circuit breakers 149 associated with each meter socket 146 of the extension meter section 140. The tenant circuit breakers 119 and 149 are configured to protect the meter sockets and related electrical units (i.e., power meters) from excess transient current.

The first enclosure section 103 and the second enclosure section 104 may be secured together via fasteners such as bolts along a side wall 109A of the first enclosure section 103 and side wall 109B of the second enclosure section 104. The first enclosure section 103 may include a baffle wall 121 which is generally parallel to the side wall 109A. The baffle wall 121 is arranged such that the meter sockets 116 are on one side and the tenant circuit breakers 119 are on the other side. The tenant circuit breakers 119 are between the baffle wall 121 and the side wall 109A. The second enclosure section 104 may include a baffle wall 122 which is generally parallel to the side wall 109B. The baffle wall 122 is arranged such that the meter sockets 146 are on one side and the tenant circuit breakers 149 are on the other side. The tenant circuit breakers 149 are between the baffle wall 122 and the side wall 105B.

Figure 3:
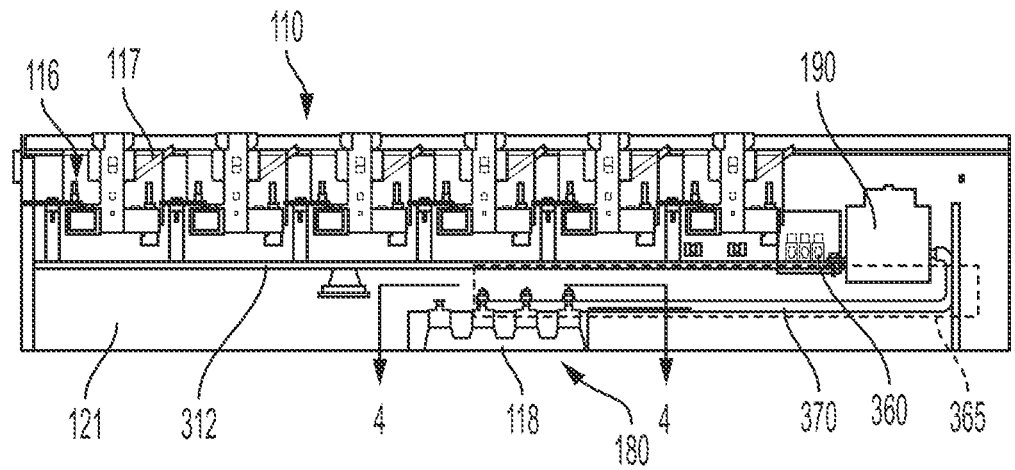
FIG. 3 is a cross-sectional view along the plane 3-3 of FIG. 2.
Figure 4:
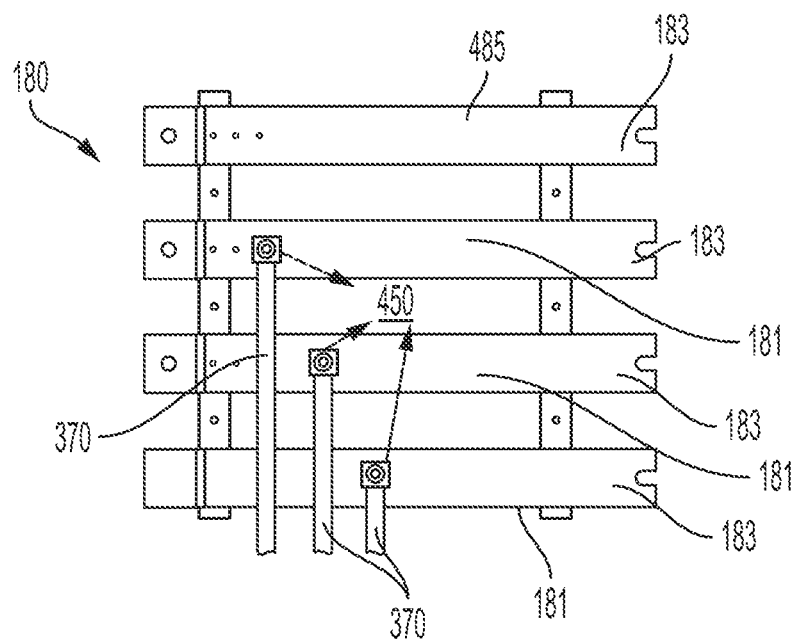
FIG. 4 illustrates a cross-sectional view along the plane 4-4 of FIG. 3.
Figure 5:
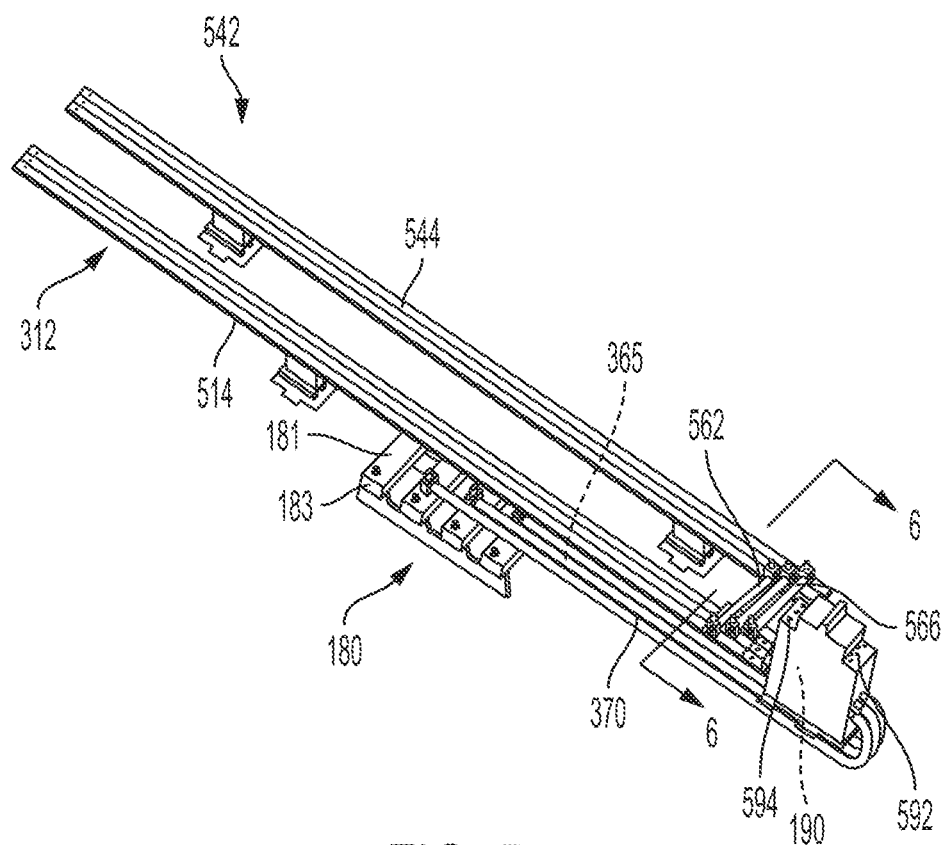
FIG. 5 illustrates a plan view of the first and second bus sections and disconnect switch of the power meter socket assembly.
Figure 6:
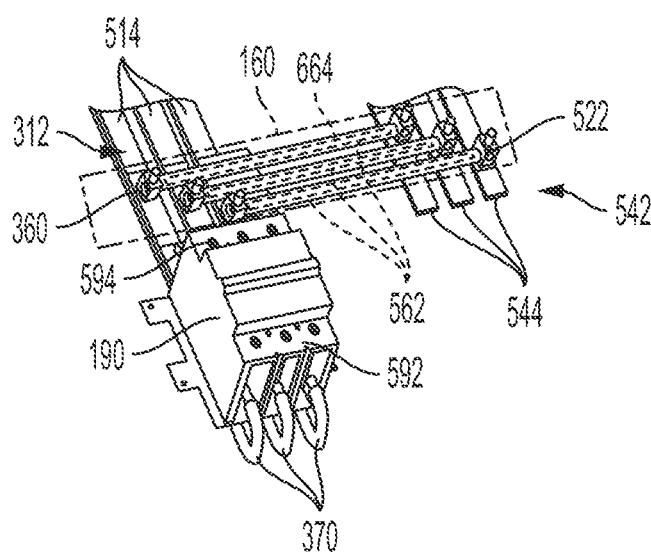
FIG. 6 illustrates a cross-sectional view along the plane 6-6 of FIG. 5.
Figure 7:
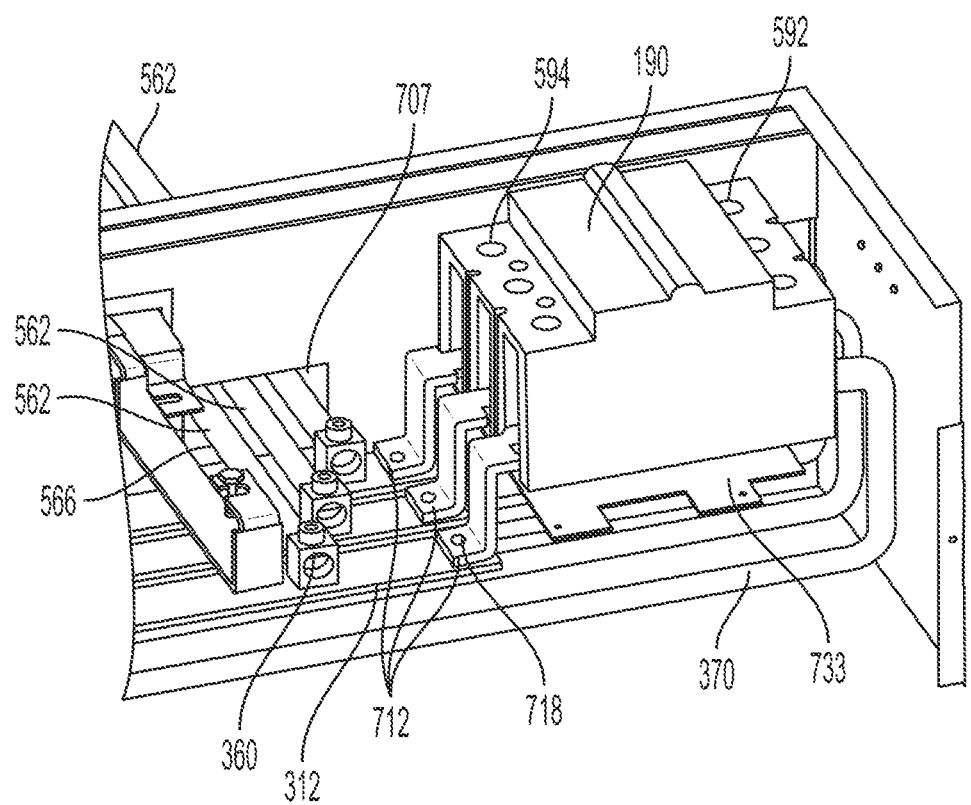
FIG. 7 illustrates a partial view of the disconnect switch and lug connection assembly installed between interior side panels.

Referring now to FIGS. 3-7, the first connection section 160 and disconnect switch 190 will be described in more detail. FIG. 3 is a cross-sectional view along the plane 3-3 of FIG. 2. FIG. 4 illustrates a cross-sectional view along the plane 4-4 of FIG. 3. FIG. 5 illustrates a plan view of the first and second bus sections and disconnect switch of the power meter socket assembly. FIG. 6 illustrates a cross-sectional view along the plane 6-6 of FIG. 5. FIG. 7 illustrates a partial view of the disconnect switch and lug connection assembly installed between interior side panels.

With specific reference to FIGS. 3 and 5-7, the primary meter stack section 110 may include a first bus section 312 having a plurality of conductors 514 that are oriented in a first direction. The extension meter stack section 140 (FIG. 1A) may include a second bus section 542 including a plurality of conductors 544 that are oriented in the first direction. The conductors 514 and 544 of the first bus section 312 and the second bus section 542 include bus bars. The first bus section 312 may include three-phase buses placed essentially in a single plane of the assembly 100. The first bus section 312 may have one or more openings to allow for electrical connection. The first and second bus sections 312 and 542 may be vertically oriented or extend along a longitudinal axis of the assembly 100.

The first connection section 160 may include a plurality of flexible conductors 562 oriented in a second direction, generally perpendicular to the first direction. Each of the flexible conductors 562 may include a wire 664, denoted in dashed outline, in FIG. 6, that extends within an insulating sleeve 566. The wire 664 may include a first end 168 that is electrically connected to a corresponding conductor 514 of the first bus section 312 and a second end that is electrically connected to a corresponding conductor 544 of the second bus section 542. Each flexible conductor 562 is connected to a corresponding phase of the conductors 514, such that there is a one to one correspondence between phases and flexible conductors 562.

The disconnect switch 190 may include a plurality of line terminals 592, each of which is electrically connected to the first power bus connection section 180 via a flexible conductor 370. The flexible conductors 370 is essentially the same as the flexible conductor 562. The flexible conductors 370 connect to the line terminals of disconnect switch 190 and wrap or loop under or below the switch 190 and extends under or below the first bus section 312 in parallel. The disconnect switch 190 may include a plurality of load terminals 594. Each load terminal 594 is electrically connected to a corresponding conductor of the first bus section 312, as will be described in more detail in relation to FIG. 7. In some embodiments, the disconnect switch 190 may be a pull-out switch by Boltswitch, Inc., Eaton Corporation, or other manufacturers of disconnect switches. An example pull-out switch may be an Eaton Bussmann™ switch. However, the invention is not limited to embodiments that employ pull-out switches, as other types of disconnect switches may be used.

The disconnect switch 190 may have a rating between about 200 Amps (A) and about 600 A.

The first connection section 160 of the power meter socket assembly 100 may include a plurality of first connecting lug connection assemblies 360 and a plurality of second connecting lug connection assemblies 522. One end of each of the flexible conductors 562 is electrically connected to a corresponding conductor 514 of the first bus section 312 via one of the lug connection assemblies 360. The other end of each of the flexible conductors 562 is electrically connected to a corresponding conductor 544 of the second bus section 542 via one of the lug connection assemblies 522. The lug connection assemblies include a lug and screw for fastening the end of the flexible conductors in the mated conductor orifice integrated in the lug body. The first connection section 160 is a flexible connection section. The electrical connection of the flexible conductors to lug assemblies 360 is removable and accomplished using a non-permanent fastening mechanism, such as a screw, between the free ends of the flexible conductors and an orifice or terminal of the lug assemblies as described in more detail in FIGS. 9A and 9B. The non-permanent fastening mechanism allows flexible conductors of the first connection section 160 which need maintenance to be easily removed and replaced.

The power meter socket assembly 100 may include a second connection section 365, as seen in FIG. 3 configured to connect the switch 190 to the power bus connection section 180. The second connection section 365 also may include flexible conductors 370 and lug connection assemblies 450 (FIG. 4). The first connection section 160 electrically connects the conductors 514 and 544 together and the conductor 514 to the disconnect switch 190 such that conductors 544 are also connected to the disconnect switch 190. The second connection section 365 connects the disconnect switch 190 to the power bus connection section 180. The power bus connection section 180 may include a neutral conductor 485 or bus bar and the conductors 181 are for the three phases. The second connection section 365 is a flexible connection section. The electrical connection of the flexible conductors to lug assemblies 450 is removable and accomplished using a non-permanent fastening mechanism between free ends of the flexible conductors and an orifice or terminal of the lug assemblies. The non-permanent fastening mechanism allows flexible conductors of the second connection section 365 which need maintenance to be easily removed and replaced.

With specific reference to FIG. 4, one end of each flexible conductor 370 is connected to a corresponding one particular conductor or bus bar 181 of the power bus connection section 180 via lug connection assembly 450. The other end of the flexible conductor 370 is connected to a line terminal 592 of the disconnect switch 190.

As best seen in in FIGS. 3 and 7, the baffle wall 121 and side walls 109A and 109B may include openings 707 for journaling the flexible conductor 562 between the first enclosure section 103 and the second enclosure section 104, such that the disconnect switch 190 is electrically coupled both the conductors 514 and 544. The disconnect switch 190 is elevated above the plane of the first bus section 312 and connected to each conductor 514 via a jumper assembly 712. The jumper assembly 712 may include a z-shaped connection bar. One end of the z-shaped connection bar may be connected to a load terminal of the plurality of load terminals 594 of the disconnect switch. The other end of the z-shaped connection bar is connected to a corresponding conductor 514, adjacent to or nearly adjacent to lug connection assembly 360 connected to the same conductor. The end of the z-shaped connection bar is connected to a corresponding conductor 514 via a removable fastener 718, such as a screw.

Accordingly, each z-shaped connection bar is electrically connected to a corresponding bus bar of the first bus section 312 via a lug connection assembly 360. The jumper assemblies may be structured to a specific rated current for each of the phases. The jumper assemblies are connected with line side of disconnect switch placed in a bottom or, alternately top of the housing.

Each of the load terminals 594 of the disconnect switch 190 is also electrically connected to a corresponding conductor of the second bus section 542 via the first connection section 160 that electrically connects the first bus section 312 to the second bus section 542. Each of the line terminals 592 of the disconnect switch 190 is electrically connected to a corresponding bus bar of the power bus connection section 180 via a corresponding flexible conductor 370 that may include a wire that extends within an insulating sleeve. The power bus connection section 180 may be horizontally oriented and is configured to receive utility supply from a main device.

Figure 8:
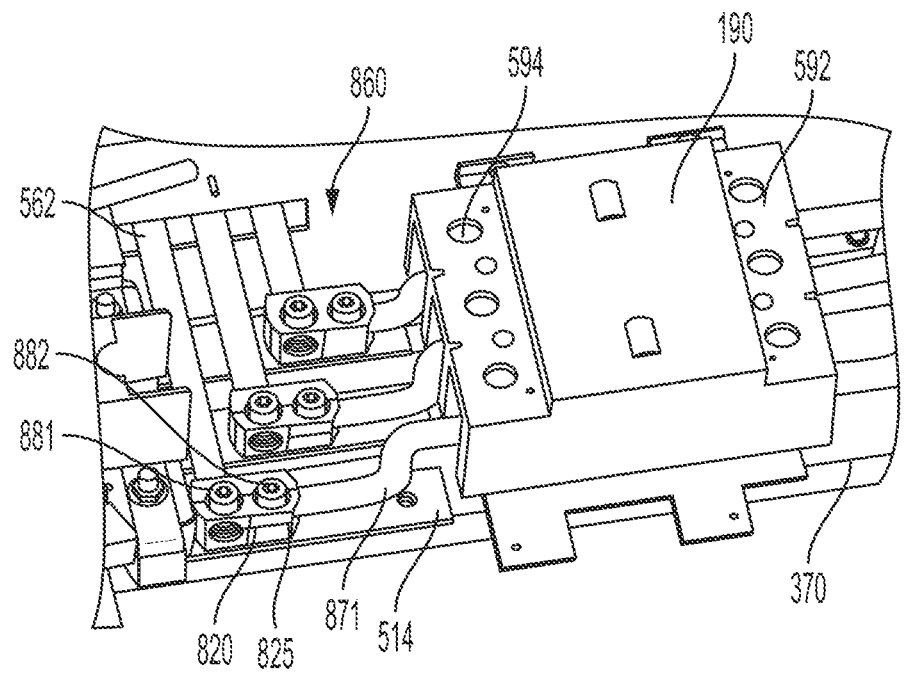
FIG. 8 illustrates the disconnect switch and alternate embodiment of a lug connection assembly of the first connection section.
Figure 9A:
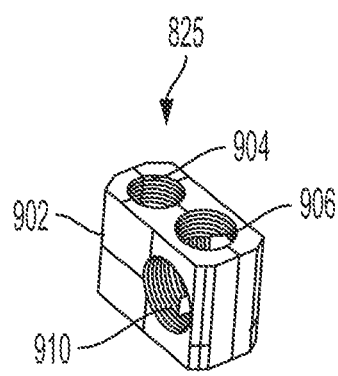
FIGS. 9A and 9B illustrate front and back perspective views of a two-way connection lug.
Figure 9B:
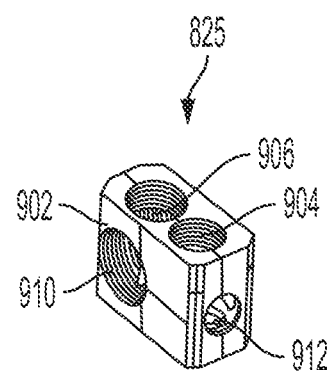

FIGS. 8 and 9A-9B show an alternate embodiment of a two-way connection lug connection assembly 820 for use with various embodiments described herein. FIG. 8 illustrates the disconnect switch 190 and alternate embodiment of a lug connection assembly 820 of the first connection section 860, only partially shown. FIGS. 9A and 9B illustrate front and back perspective views of a two-way connection lug 825. The first connection section 860 differs from the first connection section 160 by way of the electrical connection of the disconnect switch 190 to the first connection section 860. In some embodiments, the plurality of load terminals 594 are connected to the first connection section 860 using flexible conductors 871 directly coupled to lug connection assemblies 820. The flexible conductors 871 are shown in a general z-shape configuration. In this embodiment, the flexible conductor 871 is a jumper assembly used to indirectly connect the load terminals 594 to the first bus section 312 (FIG. 5) via the lug assemblies.

Each lug connection assembly 820 include a two-way connection lug 825 and a pair of lug screws 881 and 882 for fastening the end of the flexible conductors to the two-way connection lug 825. The two-way connection lug 825 is configured electrically join a pair of flexible conductors 562 and 871 together in an L-shaped configuration. Accordingly, the first connection section 860 may include a single connection to the conductors 514 which eliminates the jumper assembly 712 (FIG. 7).

Each of the flexible conductors of the pair of flexible conductors 562 and 871 of the first connection section 860 is electrically connected to a corresponding conductor 514 of the first bus section 312 (FIG. 5) via one of the two-way connection lugs 825. Each of the load terminals 594 of the disconnect switch 190 is also electrically connected to a corresponding one two-way lug 825 via one of the flexible conductors 871 of the pair of flexible conductors. Each of the two-way lugs 825 of the first connection section 860 electrically connects the first connection section 860 to the first bus section 312 (FIG. 5).

Each two-way lug 825 may include lug body 902. The lug 825 may include a first orifice 904 having a first center axis and a second orifice 906 having a second center axis adjacent to the first orifice 904 such that the first center axis and the second center axis are parallel. Each two-way lug 825 may include a third orifice 910 having a third center axis perpendicular to the first orifice 904. Each two-way lug 825 may include a fourth orifice 912 having a fourth center axis perpendicular to the second orifice and offset from the third center axis such that the fourth center axis is in a direction which is perpendicular to the third center axis and, if the fourth center axis was extended, the center axis would intersect the third center axis.

In some embodiments, the first orifice 904 and a second orifice 906 are threaded to receive and fasten a corresponding lug screw 881 and 882, respectively. The third orifice 910 and the fourth orifice 912 are threaded to receive and fasten ends of the flexible conductors.

Figure 10:
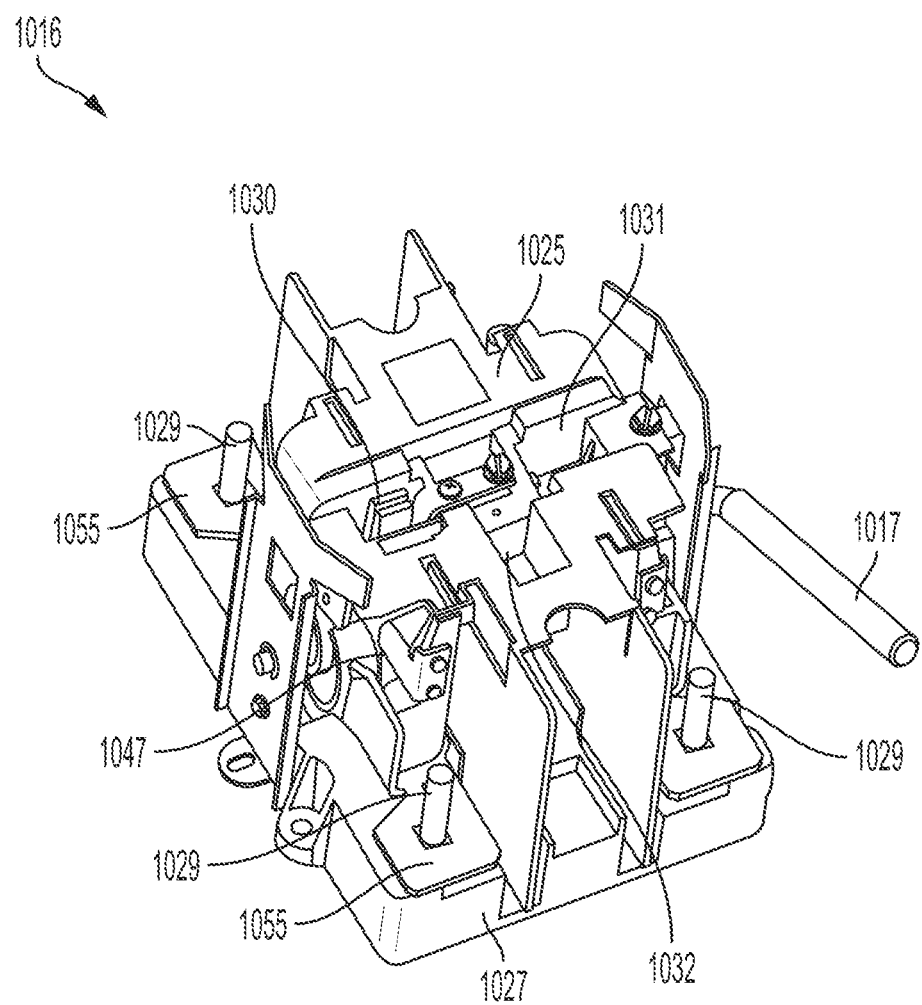
FIG. 10 illustrates a conventional meter socket with the lever bypass assembly known in the art.

FIG. 10 illustrates a conventional meter socket 1016 with a lever bypass assembly 1020 known in the art.

Each meter socket 1016 (i.e. meter socket 116 or 146) may include a plurality of female socket members 1030, 1031, 1032 and which may be plug-in type sockets formed in the insulating sheet 1025. The meter socket 1016 may include a meter base 1027 supporting the insulating sheet 1025. Each meter socket may include a handle 1017 mechanically connected to the plurality of jaws 1047. The meter base 1027 may include a plurality of support members 1029 which may be received in corner apertures of the jaw mounting pad 1055.

The use of flexible conductors and/or jumper assemblies as described in this document helps provide a more compact assembly than prior group meter stacks, without requiring the addition of bulky insulators between bus bars. This can reduce cost and provide more flexibility in construction, installation and maintenance.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A power meter socket assembly, comprising:
a primary meter stack section comprising a first bus section comprising a plurality of first conductors that are oriented substantially in a first plane;
an extension meter stack section comprising a second bus section comprising a plurality of second conductors that are oriented substantially in the first plane;
a first connection section comprising a plurality of flexible third conductors, each of the flexible third conductors includes a first end that is electrically connected to a corresponding one of the first conductors of the first bus section and a second end that is electrically connected to a corresponding one of the second conductors of the second bus section;
a power bus connection section comprising bus bars, each of the bus bars having a long surface and a short surface, the long surface of each of the bus bars oriented substantially on a third plane that is parallel to the first plane;
a disconnect switch that includes:
a plurality of line terminals electrically connected to the power bus connection section, each of the line terminals of the disconnect switch is electrically connected to a corresponding one of the bus bars of the power bus connection section via a corresponding one of a plurality of flexible fourth conductors, and
a plurality of load terminals connected to the first bus section; and
a second connection section comprising the plurality of flexible fourth conductors that are oriented substantially parallel to and below the first bus section to connect the plurality of line terminals of the disconnect switch to the power bus connection section.

2. The power meter socket assembly of claim 1, wherein:
each of the first conductors of the first bus section and each of the second conductors of the second bus section comprise a bus bar;
the primary meter stack section further comprises a first set of electric power meter sockets, each of which includes a first one of female socket members to receive and electrically connect a first one of an electric power meter to the first bus section; and
the extension meter stack section further comprises a second set of electric power meter sockets, each of which includes a second one of the female socket members to receive and electrically connect a second one of the electric power meter to the second bus section.

3. The power meter socket assembly of claim 1, wherein:
each of the flexible third conductors of the first connection section and each of the flexible fourth conductors of the second connection section comprises a wire that extends within an insulating sleeve; and
the power meter socket assembly further comprises:
a first set of lug connection assemblies that removably connects the first ends of the plurality of flexible third conductors of the first connection section electrically to the first bus section,
a second set of lug connection assemblies that removably connects the second ends of the plurality of flexible third conductors of the first connection section electrically to the second bus section, and
a third set of lug connection assemblies that removably connects first ends of the plurality of flexible fourth conductors of the second connection section electrically to the power bus connection section,
wherein second ends of the plurality of flexible fourth conductors of the second connection section are removably connected electrically to the plurality of line terminals of the disconnect switch.

4. The power meter socket assembly of claim 3, wherein each of the first set of lug connection assemblies comprises a two-way connection lug configured to electrically join a respective one of the flexible third conductors to a fifth flexible conductor in an L-shaped configuration, such that:
the respective one of the flexible third conductors removably connects the two-way connection lug of the first set of lug connection assemblies to a corresponding one of the second set of lug connection assemblies, and
the fifth flexible conductor comprises a first end that removably connects to the two-way connection lug and a second end that connects to a corresponding one of the plurality of load terminals.

5. The power meter socket assembly of claim 1, further comprising jumper assemblies, wherein each of the plurality of load terminals is coupled to the first bus section via one or more of the jumper assemblies.

6. The power meter socket assembly of claim 5, wherein each of the jumper assemblies comprises a z-shaped connection bar that is electrically connected to the corresponding one of the first conductors of the first bus section or the corresponding one of the second conductors of the second bus section via a lug connection assembly.

7. The power meter socket assembly of claim 1, further comprising a plurality of lug connection assemblies, wherein:
- each of the flexible third conductors of the first connection section is electrically connected to the corresponding one of the first conductors of the first bus section via a respective one of the lug connection assemblies; and
- each of the load terminals of the disconnect switch is also electrically connected to the corresponding one of the first conductors of the first bus section via the respective one of the lug connection assemblies that electrically connects the first connection section to the first bus section.

8. The power meter socket assembly of claim 1, wherein each of the flexible fourth conductors comprises a wire that extends within an insulating sleeve.

9. The power meter socket assembly of claim 1, further comprising a plurality of two-way connection lugs, each of the two-way connection lugs configured to electrically join a respective one of the flexible third conductors to a fifth flexible conductor in an L-shaped configuration, wherein:
- the respective one of the flexible third conductors of is electrically connected to the corresponding one of the first conductors of the first bus section via a corresponding one of the two-way connection lugs;
- the fifth flexible conductor comprises a first end that removably connects to the two-way connection lug and a second end that connects to a corresponding one of the plurality of load terminals;
- each of the load terminals of the disconnect switch is also electrically connected to the corresponding one of the two-way connection lugs via a fifth flexible conductors; and
- each of the two-way connection lugs electrically connects the first connection section to the first bus section.

10. The power meter socket assembly of claim 9, wherein each of the two-way connection lugs comprises:
- a first orifice having a first center axis;
- a second orifice having a second center axis proximate to the first orifice such that the first center axis and the second center axis are parallel;
- a third orifice having a third center axis perpendicular to the first orifice; and
- a fourth orifice having a fourth center axis perpendicular to the second orifice and offset from the third center axis such that the fourth center axis is in a direction which is perpendicular to the third center axis.

11. A power meter socket assembly, comprising:
- a primary meter stack section comprising a first bus section comprising a plurality of first conductors that are oriented substantially in a first direction;
- an extension meter stack section comprising a second bus section comprising a plurality of second conductors that are oriented substantially in the first direction, the first and second bus sections are on a single plane;
- a flexible connection section comprising a plurality of flexible third conductors that are oriented substantially in a second direction, each of the flexible third conductors is electrically connected to a corresponding one of the first conductors of the first bus section and a corresponding one of the second conductors conductor of the second bus section;
- a power bus connection section comprising bus bars, each of the bus bars having a long surface and a short surface, the long surface of each of the bus bars oriented substantially on a third plane that is parallel to the first plane; and
- a disconnect switch that includes:
  - a plurality of line terminals, each of which is electrically connected to the power bus connection section, each of the line terminals of the disconnect switch is electrically connected to a corresponding one of the bus bars of the power bus connection section via a corresponding one of a plurality of flexible fourth conductors, and
  - a plurality of load terminals, each of which is electrically connected to the corresponding one of the first conductors of the first bus section.

12. The power meter socket assembly of claim 11, wherein
- each of the first conductors of the first bus section and each of the second conductors of the second bus section comprise a bus bar;
- the primary meter stack section further comprises a first set of electric power meter sockets, each of which includes a first one of female socket members to receive and electrically connect a first one of an electric power meter to the first bus section; and
- the extension meter stack section further comprises a second set of electric power meter sockets, each of which includes a second one of the female socket members to receive and electrically connect a second one of the electric power meter to the second bus section.

13. The power meter socket assembly of claim 11, wherein:
- the flexible connection section is a first flexible connection section; and
- the power meter socket assembly further comprises:
  - a second flexible connection section comprising the plurality of flexible fourth conductors that are oriented substantially in the first direction to connect the plurality of line terminals of the disconnect switch to the power bus connection section,
  - a first set of lug connection assemblies that removably connects first ends of the plurality of flexible third conductors of the first flexible connection section electrically to the first bus section,
  - a second set of lug connection assemblies that removably connects the second ends of the plurality of flexible third conductors of the first flexible connection section electrically to the second bus section, and
  - a third set of lug connections assemblies that removably connects first ends of the plurality of flexible fourth conductors of the second flexible connection section electrically to the power bus connection section,
  - wherein second ends of the plurality of flexible fourth conductors of the second flexible connection section are removably connected electrically to the plurality of line terminals of the disconnect switch.

14. The power meter socket assembly of claim 13, wherein each of the first set of lug connection assemblies comprises a two-way connection lug configured to electrically join a respective one of the flexible third conductors to a fifth flexible conductor in an L-shaped configuration, such that:

the respective one of the flexible third conductors removably connects the two-way connection lug of the first set of lug connection assemblies to a corresponding one of the second set of lug connection assemblies, and the fifth flexible conductor comprises a first end that removably connects to the two-way connection lug and a second end that connects to a corresponding one of the plurality of load terminals.

15. The power meter socket assembly of claim 11, further comprising:

jumper assemblies, wherein each of the plurality of load terminals is coupled to the first bus section via one or more of the jumper assemblies; and a second flexible connection section comprising the plurality of flexible fourth conductors that are oriented substantially in the first direction to connect the plurality of line terminals of the disconnect switch to the power bus connection section.

16. The power meter socket assembly of claim 15, wherein each of the jumper assemblies comprises a z-shaped connection bar that is electrically connected to the corresponding one of the first conductors of the first bus section or the corresponding one of the second conductors of the second bus section via a lug connection assembly.

17. The power meter socket assembly of claim 11, further comprising a plurality of lug connection assemblies, wherein:

each of the flexible third conductors of the flexible connection section is electrically connected to the corresponding one of the first conductors of the first bus section via a respective one of the lug connection assemblies; and each of the load terminals of the disconnect switch is also electrically connected to the corresponding one of the first conductors of the first bus section via the respective one of the lug connection assemblies that electrically connects the flexible connection section to the first bus section.

18. The power meter socket assembly of claim 11, wherein each of the flexible fourth conductors comprises a wire that extends within an insulating sleeve.

19. The power meter socket assembly of claim 11, further comprising a plurality of two-way connection lugs, each of the two-way connection lugs configured to electrically join a respective one of the flexible third conductors to a fifth flexible conductor in an L-shaped configuration, wherein:

the respective one of the flexible third conductors of is electrically connected to the corresponding one of the first conductors of the first bus section via a corresponding one of the two-way connection lugs;

each of the load terminals of the disconnect switch is also electrically connected to the corresponding one of the two-way connection lugs via a fifth flexible conductors; and each of the two-way connection lugs electrically connects the flexible connection section to the first bus section.

20. The power meter socket assembly of claim 19, wherein each of the two-way connection lugs comprises:

a first orifice having a first center axis;

a second orifice having a second center axis proximate to the first orifice such that the first center axis and the second center axis are parallel;

a third orifice having a third center axis perpendicular to the first orifice; and a fourth orifice having a fourth center axis perpendicular to the second orifice and offset from the third center axis such that the fourth center axis is in a direction which is perpendicular to the third center axis.

\* \* \* \* \*